United States Patent Office 3,366,861
Patented Jan. 30, 1968

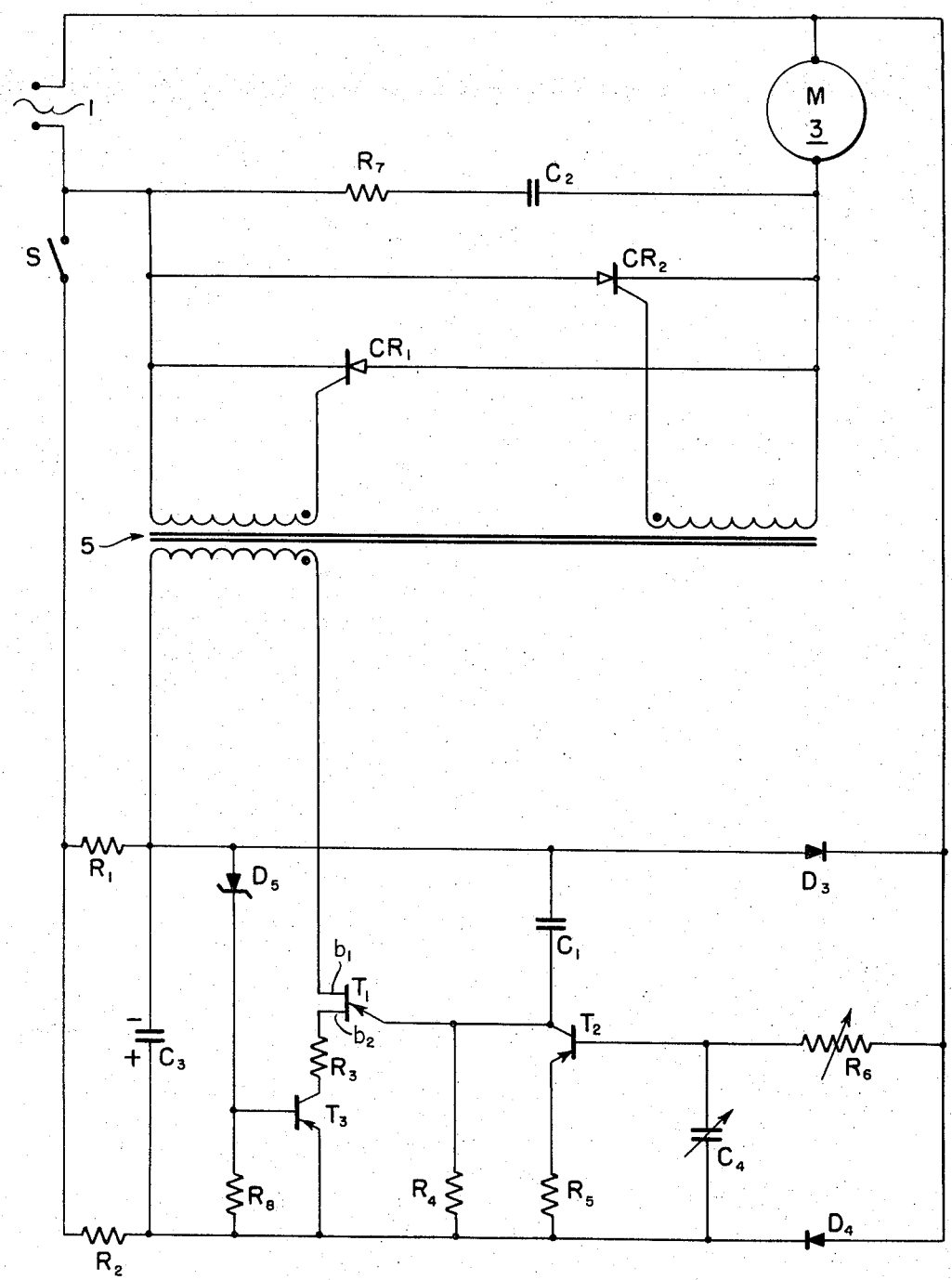

3,366,861
APPARATUS FOR REDUCING ABRUPT STARTING OF ELECTRIC MOTORS
Hans A. Dudler, Wellesley Hills, Mass., assignor to The New York Air Brake Company, New York, N.Y., a corporation of New Jersey
Filed May 26, 1965, Ser. No. 459,004
3 Claims. (Cl. 318—227)

ABSTRACT OF THE DISCLOSURE

The specification of this application describes apparatus for preventing abrupt starting of electrical motors which are energized from alternating power sources. One side of the A.C. supply line is connected to the motor through a pair of oppositely poled controllable switches, such as silicon controlled rectifiers. When power is applied to the motor, each switch is closed during alternate half-cycles of the A.C. line. During the period immediately following power application to the motor, the switches, which are controlled from a control circuit, are closed only for a very small fraction of the total half-cycle. This fraction increases, as a function of time over several hundred cycles until, the switches are closed during substantially the entire half cycle thus applying full power to the motor. The apparatus for generating the pulses includes a full-wave rectifier, and a relaxation oscillator supplied by the rectifier. The relaxation oscillator includes a storage element, i.e., a capacitor, having a variable rate charge path and a rapid discharge path. When the capacitor discharges a trigger pulse for operating the switch is provided. The rate of charging is gradually increased from the time power is applied to the circuit, thus initiating the rapid discharge of the capacitor and the trigger pulse to operate one of the solid state switches. The switch remains conducting during the remainder of the half cycle until the applied polarity reverses. Thus power is initially applied to the motor through the solid-state switches only for a short time toward the end of each half-cycle. This time increases as the charging time of the capacitor in the control circuit is reduced, until, after several hundred cycles, substantially full half-cycles are being supplied to the motor.

---

This invention concerns itself with control systems, and particularly with electrical control circuits for controlling the application of driving energy to electrical apparatus. Its principal object is to prolong the starting time of an electrical appliance and so to reduce the abruptness of a shift from a rest condition to a running condition.

Modern technology presents many situations in which the characteristics of an electrical appliance while it is running differ widely from its starting characteristics. One instance is provided by a high-powered incandescent lamp, of which the filament presents a much lower resistance when it is cold than it does when it is white hot. Application of full operating voltage to the lamp when its filament is cold results in its drawing a current of considerably greater strength than its normal current, and may either damage the lamp or disturb the operation of associated apparatus. Another instance is provided by a conventional induction motor, of which the starting torque is very low, while the starting current is very high. Once such a motor has come up to its normal running speed, slightly less than synchronous speed, it can carry its rated load at that speed. Moreover, the substantial back electromotive force which it develops while running prevents it from drawing more than its rated current. But at the start, when the driving voltage is first applied to it, its speed, and consequently its back electromotive force, are zero and its torque is small. Consequently, when first started, it draws several times its normal running current, and if it were to be started under a heavy load, and especially a heavy inertial load, it would require such a long time, e.g., many seconds, to reach its full running speed, that the long-enduring starting current might damage the motor. It is therefore customary, when possible, to start such a motor under no load, and to apply the load only after the motor has reached its normal running speed. In some situations, e.g., in the operation of machine tools, this is entirely feasible, and an adequate solution to the problem. In other situations it is not. For example, in the operation of a pump or a rolling mill, this solution requires the provision of a clutch. A more homely example is furnished by a modern mechanized cloak room or dry-cleaning establishment in which garments that have been cared for are hung, in a systematic order, on a circulating rack. When asked for a garment, an attendant stationed at the counter of the establishment closes a starting switch and so energizes a motor which advances the rack until the garment inquired for is convenient to the counter. It has been found that, when the rack is driven by an ordinary induction motor, the rack is set in motion so abruptly that, unless full speed is inconveniently slow, the garments hanging from it swing wildly and sometimes fall to the floor. In an active establishment the rack may well be started and stopped several times in a single minute. The swinging and falling of the garments is evidently a source of annoyance both to the owner of the establishment and to his customers. Evidently, too, if the solution of the clutch were adopted, the attendant would be required to engage it so slowly that the clutch itself would soon be damaged by excessive wear.

Moreover, and quite aside from the acceleration of the motor the starting current which it draws, even before its mcehanical load is applied to it, being several times as great as its rated running current, inevitably makes for a voltage surge in a power line of ordinary length and impedance; and this surge may adversely affect the operation of other apparatus fed by the same power line.

In every such situation what is needed is to cause the motor to start gently, to accelerate much less rapidly than it normally does, and to occupy a time many times as long as it normally occupies in which to come up to its normal running speed; in other words, to endow it with a starting characteristic that differs widely from that with which it was endowed by its maker; a starting characteristic which is ordinarily obtainable only with a motor specially designed for the purpose: a motor many times as costly as the ordinary induction motor. It is just such an alteration of the starting characteristic of an electrical appliance which is the object of the present invention.

This object is attained by arranging that the energizing voltage be first applied to the motor or other appliance only during a minute fraction of a single cycle of the driving voltage and that this fraction grow continuously throughout a large number, e.g., 100–200, of full cycles of the driving voltage until the active fraction occupies the entire cycle or nearly so. Stated in another way, the driving energy is applied to the appliance in a long sequence of spurts of successively greater lengths, one in each cycle or half cycle of the driving voltage until, in the end, the duration of the spurt nearly coincides with the duration of the cycle or half-cycle in which it takes place. This long sequence of successively longer spurts determines a new, prolonged, starting time for the appliance. With the technique employed, moreover, it is a simple matter to vary the duration of the prolonged starting time, and within wide limits.

In an illustrative embodiment each energy spurt is passed to the appliance through an electronic switch which is closed in response to a pulse and which is thereafter opened by reversal of polarity of the current drawn by the appliance. The actuating pulse is developed by a relaxation oscillator, which includes a storage element, e.g., a capacitor, a variable-rate charge path, and a rapid discharge path. Rapid discharge, which generates the pulse, takes place each time the charge accumulated in store exceeds a preassigned threshold; and this, in turn, depends on the rate at which the store is charged. In the illustration this rate is gradually increased throughout the new, prolonged, starting time; i.e., it is caused to depend on the total charge accumulated in another store which is charged very gradually, the full charging time occupying a large number, e.g., several hundred, cycles of the energizing voltage; and it is this second store of which the charging rate is readily variable, e.g., by alteration of the magnitude of a capacitor, a resistor, or both, thus to alter the duration of the new prolonged starting time.

The invention will be fully apprehended from the following description of an illustrative embodiment, taken in connection with the appended drawing, of which the single figure is a schematic circuit diagram showing a source of alternating current power, a motor driven by the source, and a control circuit for prolonging the starting time of the motor.

Referring now to the drawing, one terminal of a source 1 of power, specifically of 110 volt, sixty cycle power, is connected directly to one terminal of an induction motor, illustratively a motor of the split-phase starting variety. The other terminal of this motor 3 is returned to the second terminal of the source 1 through two unidirectional electronic switches $CR_1$, $CR_2$ connected in parallel and oppositely poled. Each of these may advantageously be a silicon controlled rectifier (SCR) which conducts current only in the sense indicated by the arrowhead, i.e., from anode to cathode, and only after application of an actuating pulse to its control electrode. In each case the control electrode is connected to the cathode through the secondary winding of a transformer 5 through which actuating pulses, developed as described below, are applied to the control electrodes of both switches $CR_1$, $CR_2$. Thus, in the absence of such pulses, both of the switches are non-conducting, "open" or OFF, no current flows through either of the switches, and driving power is blocked from the motor 3.

The second terminal of the source 1 is also connected to its first terminal through a control circuit shown in the lower part of the figure and through a starting switch S. Closure of the starting switch applies the voltage of the source 1 to a full wave rectifier assembly comprising resistors R1, R2, unidirectionally conducting diodes D3, D4 and a capacitor C3. When the upper terminal of the source 1 is positive, the capacitor C3 is charged, in the sense indicated by the algebraic signs, through the diode D4 and the resistor R1. When the lower source terminal is positive, the capacitor C3 is charged in the same sense through the resistor R2 and the diode D3. Thus a unipolar, quasi-steady voltage is built up on the capacitor C3. If no further circuitry were provided, the magnitude of this voltage would approach the peak voltage of the source; i.e., with a conventional source of 110 volts R.M.S., it would approach 155 volts. The capacitor voltage is, however, limited to a more moderate magnitude by a Zener diode D5 fabricated to present a reverse breakdown voltage of 20 volts, connected in shunt with the capacitor C3 and so poled that the capacitor voltage is applied to it in the reverse direction. For reasons to be explained below, the base emitter path of a transistor T3 is connected in series with the Zener diode D5, but the voltage which it supports is negligible as compared with the 20-volt breakdown back voltage of the Zener diode. With this arrangement when, in the course of its 155-volt swings, the source voltage exceeds 20 volts, the Zener diode D5 conducts in the reverse direction, the transistor T3 is turned ON, and the voltage on the capacitor C3 remains at 20 volts. When, in the course of the same swings, the source voltage falls below 20 volts, as when it is changing polarity and passing through zero, the capacitor C3 commences to discharge, and its potential falls somewhat below 20 volts. Advantageously, it does not fall nearly to zero; and this result is secured by the provision of a time constant that is substantially in excess of the cycle time or period of the source. For this purpose suitable parameter magnitudes are, for each of the resistors R1, R2, 18,000 ohms and, for the capacitor C3, 10 microfarads. With these magnitudes, the potential of the capacitor C3 falls, when the source voltage is passing through one of its zeros, to about 15 volts; and this reduction pulls the voltage applied to the Zener diode D5 below its breakdown point, whereupon its conduction ceases and the transistor T3, theretofore conducting, is turned OFF. This sequence of events takes place each time the source voltage passes through zero, i.e., at the conclusion of each half cycle, positive or negative.

One base electrode $b_1$ of a unijunction transistor T1 is connected, through the primary winding of the transformer 5, to the negative terminal of the capacitor C3. It is characteristic of such a unijunction transistor that, when a substantial voltage is impressed between its base electrodes and no significant voltage is applied to its emitter electrode, the impedance of the path from its emitter to its first base electrode $b_1$ is very high while, when a potential is applied to its emitter electrode of magnitude equal to approximately one half of its interbase voltage, this path breaks down, its impedance is suddenly reduced to a low value, and it draws a large current. The behavior of the transistor $T_1$ is thus that of a switch which conducts in response to the potential applied to its emitter electrode.

The other base electrode $b_2$ of the transistor T1 is connected, through a resistor R3, to the collector electrode of the transistor T3. Consequently, when the source voltage exceeds 20 volts and the Zener diode D5 and the transistor T3 are conducting, and in the absence of breakdown of the transistor T1, substantially 20 volts appear between its two base electrodes. But when the source voltage falls below 20 volts and the Zener diode D5 ceases to conduct and the transistor T3 is thus turned OFF, the interbase voltage of the transistor T1 falls abruptly to zero or nearly so.

A capacitor C1 and the emitter-collector path of a transistor T2 are connected, in series with a resistor R5, to the two terminals of the capacitor C3, and the collector electrode of the transistor T2 is connected directly to the emitter electrode of the unijunction transistor T1 and, through a dropping resistor R4, to the positive terminal of the capacitor C3. The emitter-collector circuit of the transistor T2 constitutes a path through which the capacitor C1, once it has been discharged, is again charged toward the voltage on the capacitor C3 and at a rate which depends on the resistance of the transistor T2, and hence on the potential applied to the base of the transistor T2, i.e., on the potential of a capacitor C4. For low values of this potential the resistance of the transistor T2 is high and the charging rate of the capacitor C1 is low, while for large values of the potential on the capacitor C4 the resistance of the transistor T2 is much reduced and the capacitor C1 is charged much more rapidly.

Whatever its charging rate, the capacitor C1 charges toward the 20-volt potential of the capacitor C3. Given time in which to do so, its potential reaches the 10-volt point. Given that the 20-volt potential is also applied between the base electrodes of the transistor T1, application of one half of its interbase voltage, i.e., ten volts, to its emitter electrode causes it to break down and to discharge the capacitor C1 through the primary winding of the transformer 5. The impulse which results in the secondary windings is applied to the control electrodes of both electronic switches $CR_1$, $CR_2$ causing one or the other to conduct current through the motor 3, in dependence on the momentary polarity of the source voltage. Whichever one of the switches $CR_1$, $CR_2$ is thus caused to conduct, its conduction continues, thus to provide the motor 3 with a spurt of driving power, until the current through the switch reverses its polarity, whereupon the conduction of the switch ceases. Because of the inductive character of the motor 3 as a load, reversal of the current polarity lags reversal of the voltage polarity. Hence, whichever of the switches $CR_1$, $CR_2$ is thus caused to conduct, its conduction continues beyond the reversal of the polarity of the source voltage and until the source voltage has commenced to build up in the reverse sense by 10–20 electrical degrees (a full cycle of the source voltage occupying 360 electrical degrees) at which time the unijunction transistor T1 is again ready to discharge the condenser C1. Hence, with an inductive load, no conduction time is lost due to the dead time of the Zener diode D5.

With a resistive load, to the contrary, there exists a brief interval, extending from just before the end of each half cycle of the source voltage to just after it, during which the capacitor C1 remains discharged, when actuating pulses cannot be delivered to the electronic switches. This period, amounting to about ten percent, or less of the full source period, is "dead"; i.e., power is excluded from the motor 3 throughout it. In most cases this is of no importance. In cases in which it is important that power be continuously delivered to the motor while it is running, a relay, electronic or mechanical, can be employed to bypass the entire control circuit.

The combination of the Zener diode D5 and the unijunction transistor T1 ensures that the charging cycle of the capacitor C1 shall commence anew, and from a reference potential of zero volts, for each half cycle of the source voltage. For, whatever the potential to which the emitter electrode of the transistor T1 may have risen when, just before the completion of any half cycle of the source voltage, conduction of the Zener diode D5 ceases and the interbase voltage of the transistor T1 falls to zero, the potential of its emitter electrode is then in excess of one half its interbase voltage so that it again breaks down. Though the charge on the capacitor C1 be small, it is nevertheless discharged through the transistor T1, and held discharged until the source voltage once more exceeds 20 volts, the Zener diode conducts, and the 20-volt interbase voltage of the transistor T1 is reestablished.

The rate at which the capacitor C1 is charged, and therefore the fraction of each source half cycle which elapses before the discharge takes place and the resulting actuating pulse is generated, are controlled by the resistance of the emitter-collector path of the transistor T2, and hence by the voltage on the capacitor C4. Starting with zero potential when the apparatus is at rest, as soon as the starting switch S is closed, the capacitor C4 commences to charge, through the resistor R6 and the diode D4, toward one half the voltage on the capacitor C3; i.e., toward 10 volts. With recommended parameter magnitudes of 25 microfarads for the capacitor C4 and 200,000 ohms for the resistor R6 (and each of these may be varied widely), the time constant of the charging circuit is many times longer than a period of the source voltage. Consequently a large number, perhaps several hundred, full source cycles elapse before the capacitor C4 has become fully charged, and the resulting gradual increase in the charging rate of the capacitor C1 continues for the same time. As the potential of the capacitor C4 rises, so does the collector potential of the transistor T2. Therefore, the emitter electrode of the transistor T1 reaches its discharging potential, illustratively 10 volts, progressively earlier in the successive source half cycles in which the consecutive discharges of the capacitor C1 take place. Inasmuch as each discharge initiates conduction of one of the electronic switches $CR_1$, $CR_2$ and that switch, once its conduction has started, continues to conduct until the conclusion of the current half cycle, the motor 3 receives a sequence of energy spurts, each occupying a fraction of a half cycle, and each enduring somewhat longer than its predecessor. At the end of this prolonged starting time, the motor remains energized for over ninety percent of each cycle.

It was remarked above that, just before the termination of each source half cycle, the interbase voltage of the transistor T1 falls to zero, thus to discharge the capacitor C1 so that its charging operation on the following half cycle shall commence at zero volts. This discharge of the capacitor $C_1$, like the earlier discharges, may generate a pulse in the primary 5, and so actuate one of the electronic switches $CR_1$, $CR_2$. But because it occurs when the source voltage is but a small fraction of its maximum value, the resulting spurt of source energy through the switch has but a negligible effect on the operation of the motor 3.

In contrast, the principal discharge of the capacitor C1, which develops the actuating pulse in the primary winding of the transformer 5, may take place early or late in the half cycle of the source 1; specifically, it takes place slightly earlier in each half cycle than in the preceding one. Whenever it takes place, once the capacitor C1 has been discharged, it commences immediately to recharge. If the discharge takes place in the course of the second quarter cycle, the capacitor C1 does not again reach its discharging potential before that source half cycle is finished. Hence there is no second discharge. If, to the contrary, the principal discharge takes place during the first quarter cycle, the capacitor C1 may discharge again before the termination of the current source half cycle, and so generate a spurious pulse. This pulse, however, does not alter the conduction conditions of the switches $CR_1$, $CR_2$. One of these switches is already conducting due to the actuating pulse and the spurious pulse, being of the same polarity as the principal pulse, is ineffective to alter its conduction. In the case of the other switch, the anode-cathode voltage is of the wrong polarity, so that it cannot be rendered conductive by any pulse, actuating or spurious.

When it is desired to bring the motor 3 to a stop, the starting switch S is opened. Immediately, the capacitor C3 commences to discharge through the resistors R1, R2, and its potential soon falls to such a point that discharge of the capacitor C1 provides insufficient energy to actuate the electronic switches. This cuts off all driving power from the motor 3, and the motor soon comes to rest. When, by discharge of the capacitor C3 the emitter-collector voltage has been removed from the transistor T2, the capacitor C4 can discharge through the emitter-base path of this transistor and the resistor R5. This discharge takes place in much less time than does the gradual charging, described above, of the capacitor C4 so that, if need be, the motor can be restarted after a pause of much shorter duration than the new prolonged starting time.

An inductive load such as is presented by the motor draws a current which lags the driving voltage by a substantial electrical angle—perhaps as much as 20 or 30 electrical degrees. When either of the electronic switches $CR_1$, $CR_2$ is conducting this current flows through it. Now this switch is turned OFF, i.e., rendered non-conducting, when the current through it passes through its zero magnitude and commences to reverse. But, because of the current lag, the source voltage has by that time reversed and reached a substantial magnitude in the reverse polarity. The sudden turning OFF of the switch results in the equally sudden appearance of a voltage across it, of the magnitude and polarity of the source voltage at the moment. But while this voltage is in the reverse direction for the switch just turned OFF, it is in the forward direction for the other switch, soon to be turned ON. To prevent this voltage surge from adversely affecting the operation of the second switch and possibly turning it ON prematurely, i.e., before the advent of the next actuating pulse from the transformer 5, an auxiliary path is provided, shunting both switches, and including a capacitor C2 and a resistor R7. These elements together constitute a trap for the transient voltage thus developed. The capacitor C2, which may be of about $\frac{1}{10}$ microfarad capacity, bypasses the greater part of the voltage surge and prevents it from adversely affecting either of the switches $CR_1$, $CR_2$. The resistor R7, which may be of about 50 ohms resistance, limits the discharge current of the capacitor C2 at the instant when the electronic switch is turned on at the proper time by the next pulse from the relaxation oscillator.

In contrast with motor starting circuits of known variety, the starting circuit of the present invention involves no alteration of the internal connections of the motor, and therefore no partial disassembly. To the contrary, the invention treats the motor always and for all purposes as a two-terminal appliance, with which the starting circuit is interconnected in the manner described above. This feature is of importance to a purchaser who may be reluctant to adopt schemes requiring alteration of the internal connections of his motor. It also gives it generality since the alterations of internal connections for a motor of one construction differ from those required for a motor of another construction. Applicability of the present invention, to the contrary, depends not at all on the construction of the motor to be controlled, but only on its starting characteristics.

Various modifications of the illustrative control circuit described above will suggest themselves to those skilled in the art.

What is claimed is:

1. In combination with a source of alternating current and a motor that is proportioned, when directly energized by said source, to draw a heavy starting current and to accelerate rapidly during a brief starting time before reaching its proper running speed,
   means for reducing the rapidity of said acceleration and the magnitude of said starting current which comprises
   a full wave rectifier assembly including unidirectionally conducting devices and a first capacitor,
   connections for applying the energy of said source to said assembly in a fashion to build up on said capacitor a unipolar, quasi-steady potential of substantial magnitude,
   a Zener diode having a preassigned breakdown voltage connected in shunt with said capacitor and poled in opposition to said potential
   whereby, when said potential exceeds said breakdown voltage, said Zener diode conducts in its reverse direction and so prevents further increase of said potential, while, when said potential falls below said breakdown voltage conduction of said Zener diode comes to a stop,
   a relaxation oscillator comprising a second capacitor, a variable rate charge path and a rapid discharge path,
   means for commencing to charge said second capacitor through said variable rate path early in each source half cycle,
   means operative while conduction of the Zener diode persists for initiating principal discharges of said second capacitor at successively more advanced instants of successive half cycles of said source,
   means for developing from each principal discharge a spurt of source energy for application to said motor,
   and means operative on cessation of conduction of said Zener diode for initiating an auxiliary discharge of said second capacitor, whereby the charging of said second capacitor on the following half cycle of said source commences from a zero-charge reference level.

2. In combination with apparatus as defined in claim 1, a unijunction transistor having two base electrodes and an emitter electrode,
   means for developing an auxiliary potential from conduction of said Zener diode,
   means for applying said auxiliary potential as a threshold potential across said two base electrodes,
   and a connection for applying the potential of said second capacitor to said emitter electrode
   whereby, when the potential of said emitter electrode exceeds a preassigned fraction of the interbase potential of said transistor, breakdown conduction of said transistor takes place, independently of the magnitude of said interbase potential.

3. Apparatus as defined in claim 2 wherein the auxiliary potential developing means comprises
   an auxiliary transistor of which the base-emitter path is connected in series with said Zener diode
   and the collector electrode is connected to one base electrode of said unijunction transistor,
   the other base electrode of said unijunction transistor being connected to the anode of said Zener diode.

References Cited

UNITED STATES PATENTS

| | | | |
|---|---|---|---|
| 2,876,406 | 3/1959 | Charbonneaux et al. | 318—227 |
| 3,177,418 | 4/1965 | Meng | 318—345 XR |
| 3,191,113 | 6/1965 | Gargani | 318—341 XR |
| 3,259,825 | 7/1966 | James | 318—341 |
| 3,307,093 | 2/1967 | Wright | 318—221 |

ORIS L. RADER, *Primary Examiner.*

G. Z. RUBINSON, *Assistant Examiner.*